Feb. 28, 1950 M. WILKINS 2,499,047
GRASS SEED STRIPPER
Filed June 25, 1947 3 Sheets-Sheet 1

Inventor
Mitchell Wilkins
By Clarence A. O'Brien
and Harvey B. Jacobson
Attorneys

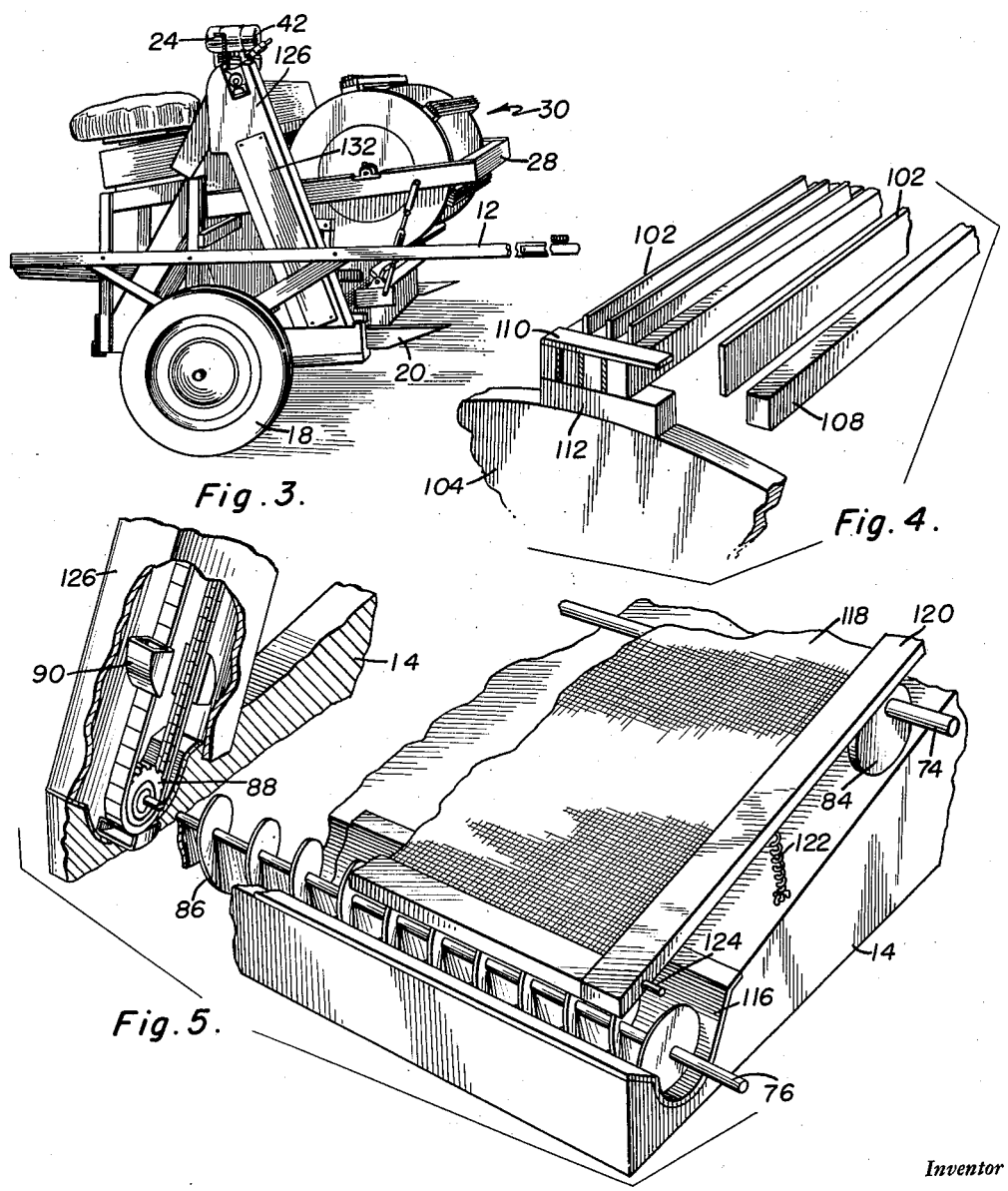

Feb. 28, 1950         M. WILKINS                2,499,047
                   GRASS SEED STRIPPER
Filed June 25, 1947                         3 Sheets-Sheet 3

Inventor
Mitchell Wilkins
By *Clarence A. O'Brien and Harvey B. Jacobson*
Attorneys Patented Feb. 28, 1950

2,499,047

UNITED STATES PATENT OFFICE 2,499,047

GRASS SEED STRIPPER

Mitchell Wilkins, De Funiak Springs, Fla., assignor of one-half to Edwin H. Finlayson, Pensacola, Fla.

Application June 25, 1947, Serial No. 756,836

11 Claims. (Cl. 56—19)

This invention relates generally to harvesting implements, and more particularly to a grass seed stripping machine adapted for movement over a field and including a plant head deflecting reel and a rotary stripper mounted beneath the reel, whereby the heads of the seed plants may be drawn between said reel and stripper and stripped of mature seeds or seed elements without parting said heads from the plants.

This invention is conceived and developed for gathering the seeds of a recently developed variety of Bahia grass, officially known as Pensacola Bahia grass, found growing in the city limits of Pensacola, Florida, and developed for use as a pasture grass. This grass is a perennial producing an abundance of seed each year and the plant stands erect to a height of some fifteen (15) to thirty (30) inches, the first seed heads ripening several months before other seed heads develop and ripen. When the seed ripens, it is very easily stripped from the heads, while the unripened seeds are not easily stripped from the heads. It is therefore necessary to strip seeds three or four times through the seeding season to gather the maximum amount of seed per acre. This invention was developed to strip off the ripe seeds and to do this without damaging the green seed heads, thus allowing the machine to be run over the seed plot there three or four times per year. It should be noted that the device is designed to remove the seeds from the ripened heads without removing the heads from the plants.

It is a primary object of this invention, therefore, to provide a seed harvesting machine which can be effectually used to strip the mature seeds from Bahia grass, without damaging the unripened heads.

It is another salient object of this invention to provide a novel combination of resilient bladed rotary members which are mounted on an ambulant frame and which draw the heads of the plants through a small space between the rotary members, stripping the ripened seeds from the heads as the machine moves forward and exerting a predetermined degree of pressure and tension upon the heads insufficient to part the heads from the plants, or to uproot the plants from the soil.

Another object of this invention is to provide a device of this character which may be used with success in harvesting the seeds of other plants.

Still another object of this invention is to provide a grass seed stripping machine which screens, elevates and bags the seed.

Still another object of this invention is to provide a stripping machine which may be made in different sizes and either mounted upon a wheeled frame or mounted on a tractor, or even adapted for use as a hand operated machine.

And a last object to be specifically mentioned is to provide a machine of this character which is relatively inexpensive and practicable to manufacture, extremely convenient and simple to use and to adjust for varying conditions encountered, and which is generally efficient and durable in service.

With these objects definitely in view, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 3 is another perspective view of the assembled machine, taken from the side opposite to that from which the Figure 1 was viewed;

Figure 4 is a fragmentary exploded view of a portion of the reel, the view being in perspective and designed to illustrate how the resilient strap members are secured in circumferentially spaced relation on the reel;

Figure 5 is a grouped view of a portion of the frame of the machine and contiguous portions of the transversely disposed screw conveyor, the lower end of the elevator, the screen and the eccentric means used to vibrate this screen;

Similar characters of reference designate similar or identical parts and portions throughout the specification and throughout the several views of the drawings.

Figure 1:
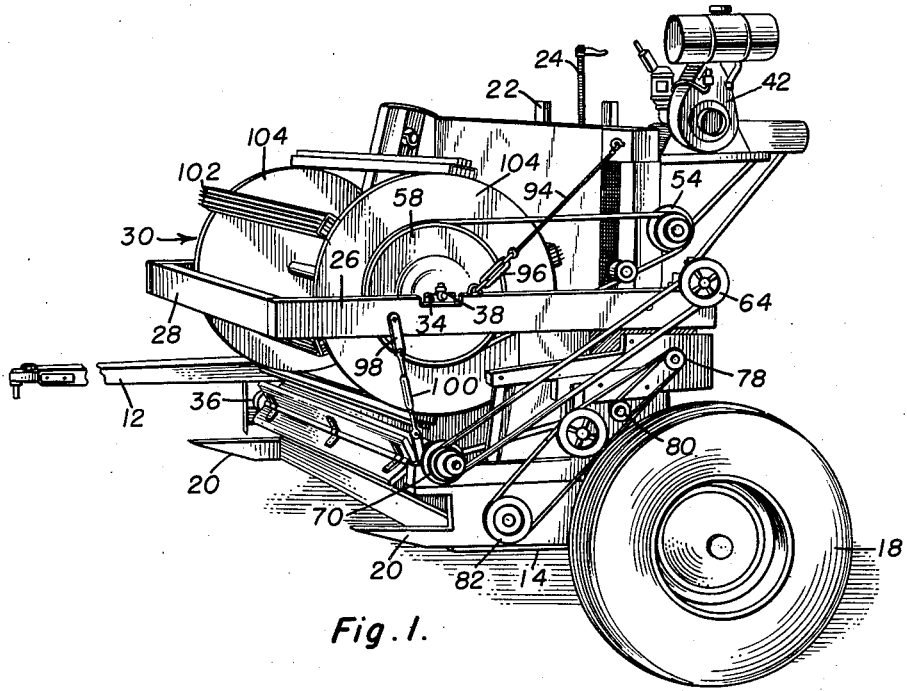
Figure 1 is a perspective view of the assembled machine.
Figure 2:
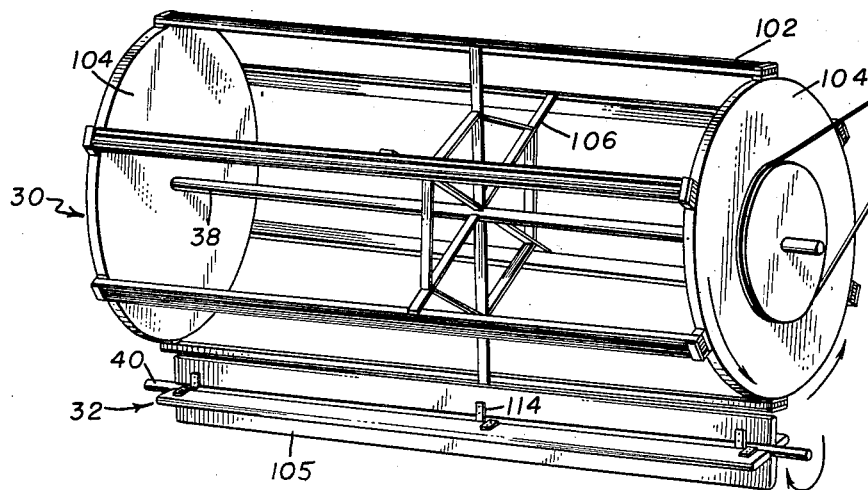
Figure 2 is a perspective view of the reel and the stripper, the arrows showing the direction of rotation of these members.

Referring now to the drawings in detail, it will be noted that the environment wherewith this invention is adapted to be used, includes a growth of Bahia grass and, when the device is mounted upon a wheeled frame as illustrated in the drawings, this frame will be connected by means of a tongue 12 to a tractor or other hauling means. The frame of this machine need not be constructed strictly in accordance with the form of the device illustrated in the drawings and the numeral 14 indicates any suitable foundation structure having an axle 16 upon which a pair of ground-contacting wheels 18 are terminally secured. The frame may include grass plant guide members 20 disposed laterally of the frame and at the front end thereof. A sub-frame having the major portion of the working elements of the invention mounted thereon is vertically adjustably mounted upon the main frame 14, so that the major working elements may be raised and lowered according to the height of the crop being harvested, but since the particular means of adjustably mounting this sub-frame is not material in this application, this structure is merely indicated in Figure 1 by a pair of uprights 22 constructed of angle iron and it will be understood that these uprights slide within coacting guide angle iron uprights fixed to the main frame 14, the screw jack 24 being operatively connected to cross braces supporting the corresponding pairs of uprights in any suitable manner to raise and lower the sub-frame. In the following description, the sub-frame will not be specifically differentiated from the main frame.

Further frame structure includes a pair of forwardly extending substantially horizontal reel supporting arms 26 which may be secured together at the forward ends by a cross brace 28, and these arms support the reel which is generally indicated by the numeral 30. A lower portion of the frame structure supports the rotary stripper which is generally indicated by the numeral 32 and suitable bearings 34 and 36 are provided to terminally support the shafts 38 and 40 of these rotating members, respectively. Power means, ordinarily constituting a gasoline motor and illustrated at 42, is connected by a belt 44 to a pulley 46 which is illustrated as positioned on the right hand side of the machine and the drive shaft 48 is driven by the pulley 46 to transmit power to the gear wheels 50, to the shaft 52, the pulley 54, and by means of a belt 56, to the pulley 58 on the left hand end of the shaft 38.

Another set of pulleys 60, 62 and 64, together with belts 66 and 68 drive the pulley 70 on the shaft 40 of the rotary stripper and the shaft 72 at the lower rear of the machine. The shafts 74 and 76 are belt driven by a pulley 78 secured on the said shaft 72 and pulleys 80 and 82 secured on the shafts 74 and 76 respectively. The shaft 74 carries the eccentrically mounted rollers 84 which operate the screen 118 subsequently described and the shaft 76 is axially mounted within the transversely disposed screw conveyor 86.

The stripper and reel rotate in opposite directions and the circumferential speed of the stripper may be greater than the circumferential speed of the reel.

The shaft 76 has rigidly secured thereon, at the right hand end thereof, a sprocket wheel 88 which drives the endless cupped elevator 90, and a second sprocket wheel 92 is freely rotatably mounted on a stub axle on the upper right hand side of the machine. Means to vary the relative rotational speeds of the reel and stripper will be provided, as illustrated by the pulleys 54 and 70 in Figure 1, which are each of multiple sheave character.

A pair of links 94 have one end of each secured to the upper portions of the frame at both sides thereof and the other ends of the links are secured to turnbuckles 96 fastened to the arms 26 carrying the reel 30. These turnbuckles 96 and links 94 allow limited adjustment of the arms relative to the frame. A similar construction designed to allow adjustment of the stripper involves provision of another pair of links 98 and turnbuckles 100 and it will be seen that this construction allows a limited adjustment of the reel 30 and the stripper 32 relatively, it being understood that provision is made in the frame structure to allow the supporting members for the reel and stripper to pivot upon the frame. It has been found, in practice, that the spacing between the resilient strap members 102 of the reel and the members 105 of the stripper should be in the order of one quarter of one inch when the device is used to strip the ripened seeds from the heads of Bahia grass, and it is conceivable that supplementary means, other than that illustrated in the drawings, may be employed to gauge this spacing accurately.

The reel 30 is constructed with end discs 104, a central spider 106 secured to the shaft 38 and a plurality of longitudinally disposed built-up members including a plurality of straps 102 constructed of rubber or similar resilient material fastened between elongated rigid members 108 which are rigidly secured in spaced circumferential relation on the discs 104. The method of securing these members 108 to the discs is a matter of individual preferment and mechanical expediency, the method shown in the drawings employing an upper and lower plate 110 and 112, the plate 112 being rigidly secured to the discs and the upper plate 110 being secured, by means of screws or the like inserted through the plate 110 and the individual members 108, to clamp these members 108 on the lower plate 112. When the discs 104 and the members 108 are constructed of metal, the method of securing these members to the discs 104 may be suitably revised, and any preferred auxiliary means, such as adhesive or screws may be used to secure the resilient portions 102 to the rigid portions 108 throughout the length thereof.

The blades 105 of the stripper may be considerably less resilient than the members 102 and these blades are secured, by means of simple brackets 114, to the shaft 40, the brackets being spaced along the shaft 40 as required to give proper support to the blades.

Figure 6:
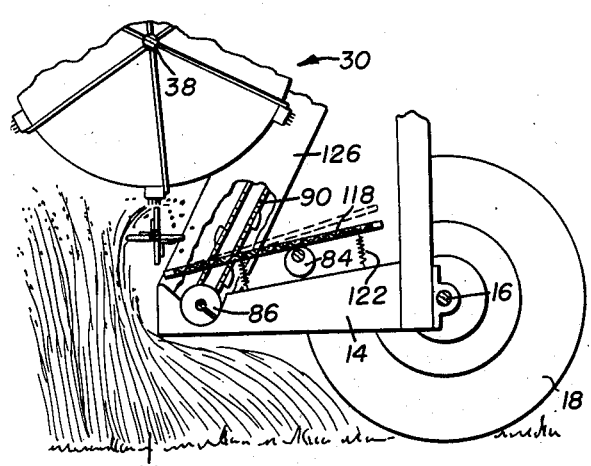
Figure 6 is a diagrammatic view of certain portions of the machine, the figure being designed to illustrate how the heads of the seed grass plants are drawn between the reel and the rotary stripper, portions of the machine being broken away and the underlying portions shown in vertical section to show the relationship of the screen, screw conveyor and elevator.
Figure 7:
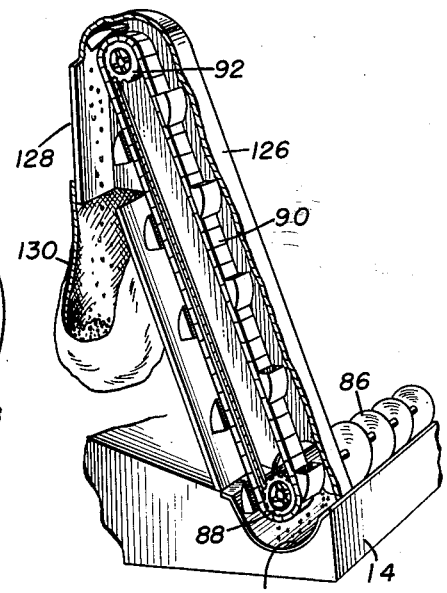
Figure 7 is a perspective view, fragmentary in character, designed to illustrate the construction of the conveyor.
Figure 8:
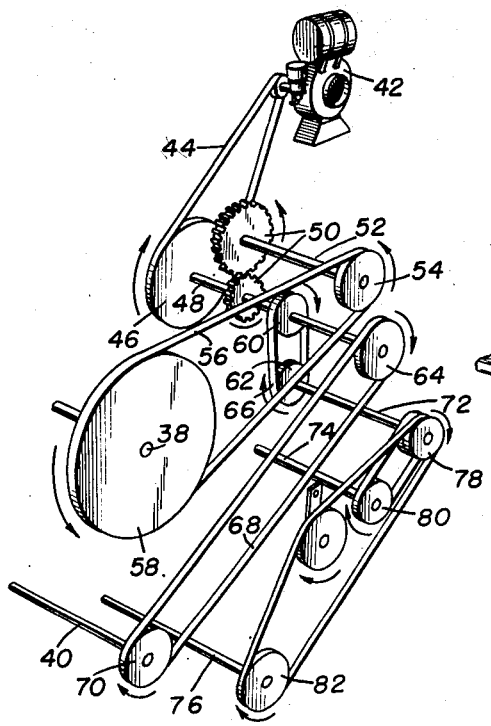
Figure 8 is another diagrammatic view designed to show how the power for the various elements of the machine is transmitted from a small motor mounted upon the frame of the machine.
Figure 9:
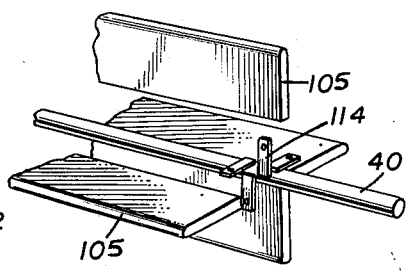
Figure 9 is a fragmentary perspective view of one end of the stripper, two of the blades of the stripper being removed from their attachment brackets and positioned outwardly therefrom.

The transversely disposed screw conveyor 86 turns within an elongated arcuate recess 116 which is illustrated as lined with metal and is formed in the portion of the frame immediately behind and below the stripper 32. A screen comprised of a foraminous sheet 118 and a rigid frame 120 therefor is mounted by means of tension springs 122 to the frame 14, the points of connection of the springs 122 being intermediate the ends of the frame 120. The end of the frame 120 disposed as to the left in Figure 5 is pivoted to the frame as diagrammatically illustrated in Figure 6 and at 124 in Figure 5. Several springs 122 may be provided and the eccentric 84 will, of course, contact the frame 120 to vibrate the screen. The elevator 90 is provided with a housing 126 and this housing is mounted upon the frame and is provided with means 128 of any suitable character adapted to facilitate the holding of a bag 130, the exact character of this construction being immaterial in this application. The side of the housing 126 of the elevator will preferably be provided with a removable plate 132 to facilitate in the cleaning of the elevator and the repair of the same.

The operation of this invention will be clearly understood from the foregoing description of the mechanical details thereof, taken in connection with the above recitation of objects sought to be achieved by this invention.

Obviously many minor variations may be made in the construction and proportionment of the various elements of this invention, and though there has been shown a particular embodiment of this invention, this application is not limited to this particular embodiment, but it is desired to include in the scope of the invention the construction, combination and arrangement of parts and portions substantially as set forth in the appended claims.

Having described the invention, what is claimed as new is:

1. A grass seed stripping machine adapted for movement over a field, including a frame, a plant head deflecting reel rotatively mounted on said frame, and a stripper rotatively mounted on said frame beneath and adjacent said reel, power means for positively rotating said reel and said stripper in opposite directions, whereby the heads of seed plants may be drawn between said reel and stripper and stripped of mature seed elements without parting said heads from the plants.

2. A grass seed stripping machine adapted for movement over a field, including a frame, a plant head deflecting reel rotatively mounted on said frame, and a stripper rotatively mounted on said frame beneath and adjacent said reel, power means for positively rotating said reel and said stripper in opposite directions, the said reel having resilent head contacting members.

3. A grass seed stripping machine adapted for movement over a field, including a frame, a plant head deflecting reel rotatively mounted on said frame, and a stripper rotatively mounted on said frame beneath and adjacent said reel, power means for positively rotating said reel and said stripper at different rotational speeds and in opposite directions said reel having circumferentially spaced elongated resilient members to engage plant heads and said stripper has a circumferential speed greater than the circumferential speed of the reel.

4. A machine according to claim 1, and including means to vary the relative rotational speeds of said reel and stripper to adapt the machine to varying conditions.

5. A machine according to claim 1 and including means to vary the spacing of said reel and stripper.

6. A machine according to claim 1 and in which said reel has a plurality of circumferentially spaced resilient head contacting members, each member comprising a plurality of elongated resilient straps and elongated rigid members supporting the straps in circumferentially spaced relation.

7. A machine according to the immediately preceding claim 6 and in which said reel has a plurality of circumferentially spaced resilient head contacting members, each of said straps and rigid members being longitudinally arranged in said reel and substantially coextensive in length with said reel.

8. A machine according to claim 1 and in which said stripper includes a plurality of radially extending longitudinally disposed members.

9. A machine according to claim 1 and in which said stripper includes a plurality of radially extending longitudinally disposed members, said members being resilient.

10. The combination in an ambulant grass seed stripping machine, of a reel having resilient plant head deflecting members, a vaned rotary stripper beneath and adjacent said reel, frame means to mount and power means to rotate said reel and stripper, means to screen mature seed elements stripped from plant heads by said reel and stripper, and means to elevate and bag the screened seed elements.

11. The combination recited in claim 10 and in which said elevating means includes a screw conveyor transversely mounted on said frame and an endless cupped elevator at one end of said conveyor, said screening means comprising a rigid foraminous member secured to said frame means by tension springs attached to the foraminous member intermediate the ends thereof and having one end pivoted on said frame means and the other end resting on an eccentric member rotatively mounted on said frame and operatively connected with said power means.

MITCHELL WILKINS.

REFERENCES CITED

The following references are of record in the file of this patent:

UNITED STATES PATENTS

| Number | Name | Date |
|---|---|---|
| 166,605 | Gordon et al. | Aug. 10, 1875 |
| 759,381 | Kierolf | May 10, 1904 |
| 1,297,349 | Herr | Mar. 18, 1919 |
| 1,575,605 | Clapp | Mar. 2, 1926 |
| 2,046,932 | Wyatt | July 7, 1936 |
| 2,233,253 | Cory | Feb. 25, 1941 |
| 2,301,873 | Heth et al. | Nov. 10, 1942 |